United States Patent
Fiddler et al.

[15] 3,637,961
[45] Jan. 25, 1972

[54] A CONTROL DEVICE FOR ACTUATING A SWITCH AND DIRECTING A FLUID PRESSURE FORCE

[72] Inventors: Theodore E. Fiddler, 1268 Suffield Drive, Birmingham, Mich. 48008; Arnold G. Adams, Troy, Mich.

[73] Assignee: said Fiddler, by said Adams

[22] Filed: Dec. 2, 1970

[21] Appl. No.: 94,283

[52] U.S. Cl. ..................................200/61.86, 137/625.48
[51] Int. Cl. .................................................H01h 9/06
[58] Field of Search................................200/61.86

[56] References Cited

UNITED STATES PATENTS 3,048,675  8/1962  Olson et al..........................200/61.86

*Primary Examiner*—Robert K. Schaefer
*Assistant Examiner*—M. Ginsburg
*Attorney*—William T. Sevald

[57] ABSTRACT

A control device having one moving body for actuating application of both electromotive force (e.m.f.) and fluid-pressure-force (FPF) in a system such as vehicular heating, ventillating, and/or air-conditioning having a case with a first wall equipped with selectively positioned FPF supply ports and use ports located between supply and use in the system and a second wall equipped with e.m.f. selectively positioned switch arms and contacts located between EMF supply and use in a system; a movable body having a first surface equipped with a grooved maze lying against the ported wall of the case forming a plurality of selective FPF channels relative to the FPF supply and use ports and having a second surface equipped with cam ramps for actuating the EMF switch arms selectively relative to the contacts; and means for selectively moving the body relative to the case to change the maze channels relative to the ports and change the cams relative to the switch arms to selectively and simultaneously control the application of e.m.f. and FPF in the system.

5 Claims, 10 Drawing Figures

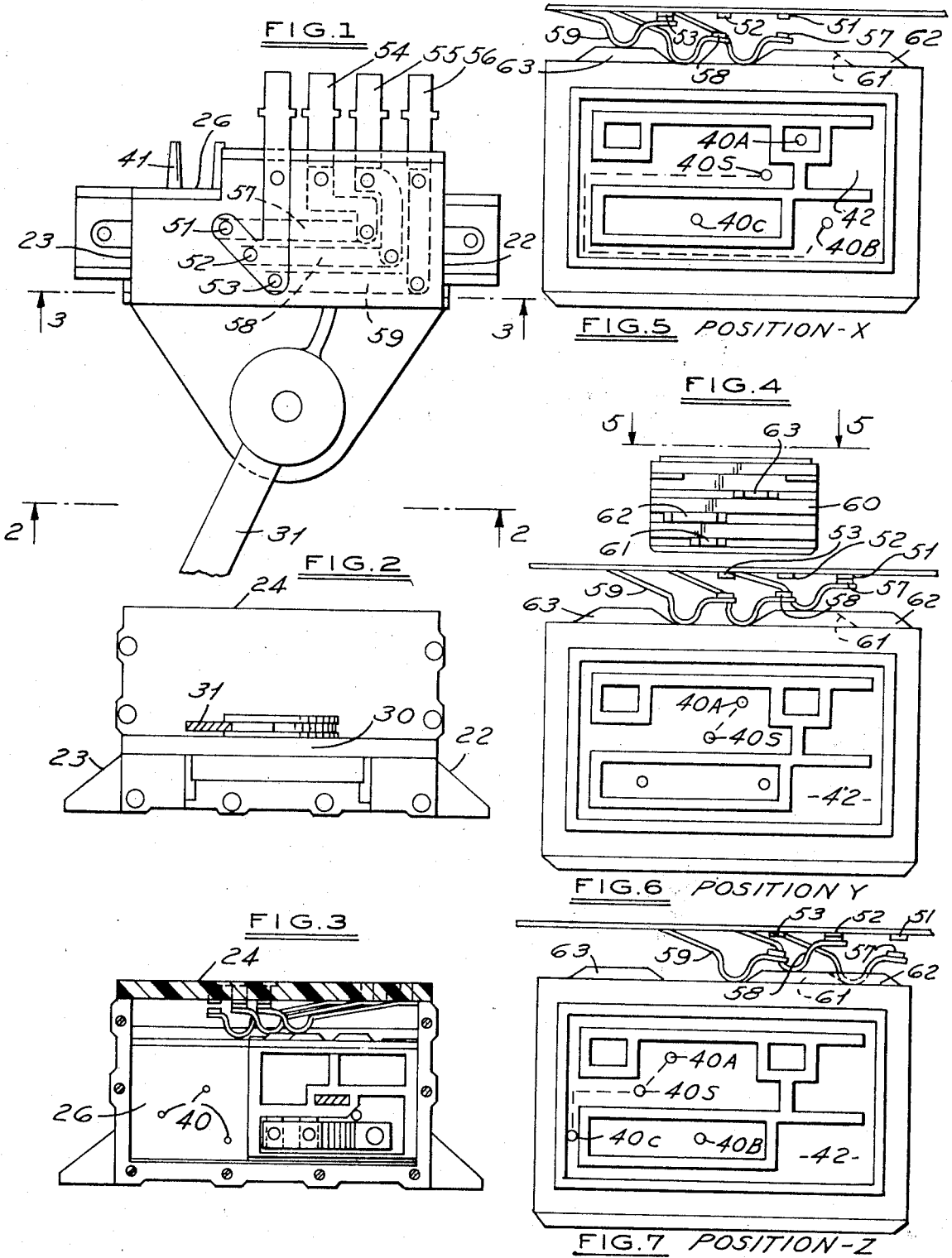

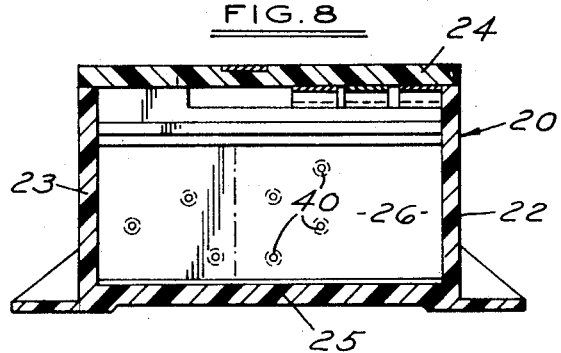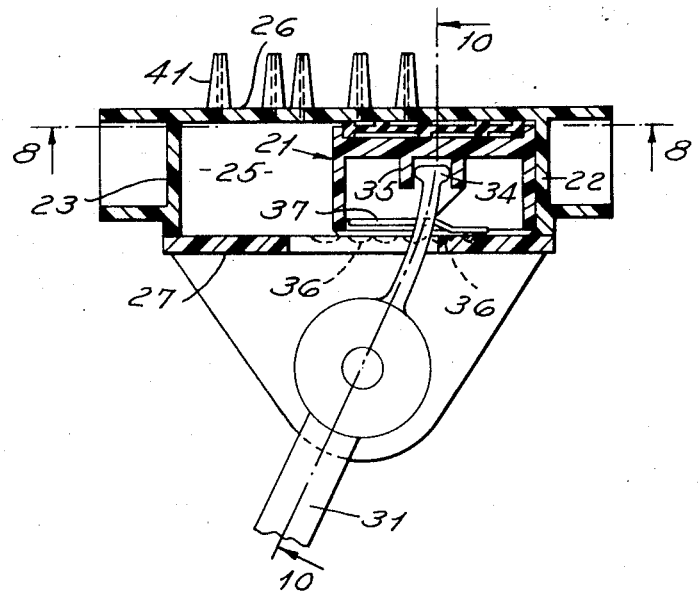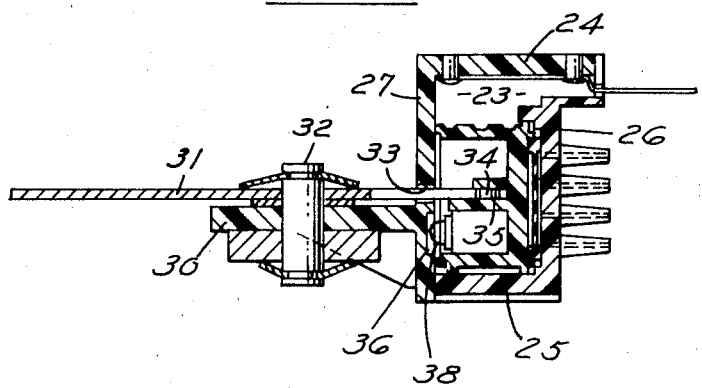

A CONTROL DEVICE FOR ACTUATING A SWITCH AND DIRECTING A FLUID PRESSURE FORCE

This invention relates to a control device having one moving body for actuating application of both electromotive force (e.m.f.) and fluid-pressure force (FPF) in a system such as vehicular heating, ventilating, and/or air-conditioning.

Control devices of the prior art employed heretofore have a plurality of moving bodies, are complicated in design and construction, expensive to manufacture, difficult to operate, use, and repair, and cumbersome to place, mount, and connect.

With the foregoing in view, it is a primary object of the invention to provide a control device which has a single moving body, is simple in design and construction, inexpensive to manufacture, easy to operate, use, and repair, and facile to place, mount and connect.

A further object of the invention is to provide a case equipped with FPF connections and valve ports and equipped with e.m.f. terminals, contacts, and switch arms.

A further object of the invention is to provide a single moving body in the case having a plural channel maze side relative to the FPF ports and a plural cam ramp side relative to the e.m.f. switch arms so that movement of the body relative to the case selectively actuates the desired coordinated application of both e.m.f. and FPF in a system.

These and other objects of the invention will become apparent by reference to the following description of a control device embodying the invention taken in connection with the accompanying drawings, in which:

FIG. 1 is a top plan view of a control device embodying the invention showing the e.m.f. connections in elevation, showing the contacts in dotted lines, and showing the actuator lever foreshortened.

FIG. 2 is a back-elevational view of the device seen in FIG. 1, taken on the line 2—2 thereof, showing the lever in cross section, and showing an entry slot for the lever leading to the interior of the case.

FIG. 3 is a vertical cross-sectional view of the device seen in FIG. 1, taken on the line 3—3 thereof, showing the body in elevation in the case with the body equipped with cam ramps for operating the e.m.f. switch arms, a spring detent arm on the body bearing against the case to hold its opposite channel maze face sealed against the body in a selected position and to give "position feel" to the operator, and showing FPF ports in the case.

FIG. 4 is a top plan view of the body seen in FIG. 3 showing the cam ramps.

FIG. 5 is an opposite side enlarged cross-sectional view of the device seen in FIG. 3, such as on the line 5—5 of FIG. 4 showing the channel face of the body in elevation; the switch arms and cam ramps in one position; the ports and channels in one position; and with modified cam ramps.

FIG. 6 is a view similar to FIG. 5 showing the actuation of different switch arms and channels with the body in a second position.

FIG. 7 is a view similar to FIGS. 5 and 6 showing the actuation of different switch arms and channels with the body in a third position.

FIG. 8 is a cross-sectional view of the case, similar to FIG. 3, taken on the 8—8 of FIG. 9, showing the ported wall of the case.

FIG. 9 is a horizontal cross-sectional view of the device seen in FIGS. 1, 2, and 3; and FIG. 10 is a vertical cross-sectional view of the device seen in FIGS. 1, 2, and 8, taken on line 10—10 of FIG. 9.

Referring now to the drawings wherein like numerals refer to like and corresponding parts throughout the several views, the control device disclosed therein to illustrate the invention comprises, a case 20 and a body 21. The case 20 has opposite end walls 22 and 23, a top wall 24, a bottom wall 25, a front wall 26, and a backwall 27. The walls 22–27 define a hollow interior and house the body 21 therein. The case 20 walls may be split as desired, such as seen in FIG. 9, wherein front wall 26 and bottom wall 25 are separably attached to the other walls to open the case 20.

An arm 30 extends from the backwall 27. A lever 31 is fulcrumed on the arm 30 by a stud 32. The lever 31 leads through a slot 33 in the backwall 27 into the interior of the case 20. An inner end 34 on the lever 31 sits in a pocket 35 in the body 21. The case backwall 27 has a series of spaced depressions 36. A spring arm 37 on the body 21 has a ball detent end 38 bearing against the depressions 36. The spring arm 37 urges the body 21 against the front wall 26.

By swinging the lever 31, the body 21 is caused to slide against the front wall 26 and the ball detent end 38 to move across the depressions 36 in the backwall 27 giving the operator "positioned feel" and also locating and holding the body 21 at the adjusted position.

Ports 40, such as 40S, 40A, 40B, and 40C, are formed in the front wall 26. Nipples 41 surmount the ports 40 for connection to tubular lines. A channel maze 42 of at least two channels is formed on a surface of the body 21. The channel maze surface 42 on the body 21 bears against the front wall 26 and coacts with the ports 40 selectively at various positions as desired and integrated in the positioning of the ports 40 and the design of the channel maze surface 42. By swinging the lever 31, the maze surface 42 is moved relative to the ports 40 to change channeling therebetween.

An electrical terminal strip 50 on the case wall 26 has three contacts 51, 52, and 53. Terminal strips 54, 55, and 56 on the case top wall 26 have attached switch arms 57, 58, and 59 respectively which, when actuated, complete a circuit to the contacts 51, 52, and 53 respectively. The body 21 has a surface 60 having cam ramps 61, 62, and 63. The cam ramps 61, 62, and 63 coact with switch arms 57, 58, and 59 respectively to make and break circuits at the contacts 51, 52, and 53 respectively. By swinging the lever 31, the cam ramps 61, 62, and 63 are moved relative to the switch arms 57, 58, and 59 to change circuits therebetween.

FPF supply may be higher or lower than atmospheric pressure and is connected to one or more ports 40 by tubular lines on at least one nipple 41. FPF tubular lines to use are connected also on the nipples 41 and lead to items which are powered thereby. E.m.f. wires are connected to the terminal strips 50, 51, and 52 and 53 in circuits between supply and use, and connect to items which are powered thereby when the switch arms 57–59 are actuated.

Referring now to FIGS. 5, 6, and 7 showing illustrative positions X, Y, and Z respectively, the FPF and e.m.f. are variously controlled by the device. In FIG. 5, e.m.f. supply is connected to use by ramp 63 closing switch arm 59 on contact 53 and FPF supply is connected to use by supply port 40S being channeled to use port 40B as indicated by the broken line. In FIG. 6, e.m.f. supply is connected to use by ramp 61 closing switch arm 57 on contact 51 and FPF supply is connected to use by supply port 40S being channeled to use port 40A as indicated by the broken line. In FIG. 7, e.m.f. supply is connected to use by ramp 62 closing switch arm 58 on contact 52 and FPF supply is connected to use by supply port 40S being channeled to use ports 40A and 40C as indicated by the broken lines.

It will be understood that the channel maze surface 42 may be grooved as desired to connect and/or block use ports 40A, B, C, relative to the supply port 40S at the various positions of the body 21 as desired and that the cam ramps 61–63 may be located selectively to actuate switch arms 57–59 at the various positions of the body 21 as desired.

The number of switch arms, contacts, terminals and ramps, the number of ports and channels, and the number of various positions are designed and engineered in the device to suit the needs of desired control and/or to provide a device with a large plurality of e.m.f. and FPF actuation positions so that less than all control positions may be selectively used. While the movement of the body 21 has been shown and described as lever actuated, the body 21 and case 20 relative movement may be actuated by cams, cables, etc.

In an exemplary installation of the control device of the invention in a vehicle heating, ventilating and/or air-conditioning system, the FPF circuits are connected to the pressure powered servomechanism, and/or motors and the e.m.f. circuits are connected to the electrically powered servomechanisms, and/or motors. In the control of the system, the FPF and e.m.f. powered elements are coordinated for operating sequences and nonoperating sequences. The interaction of the ports 40 and channel maze surface 42 is coordinated with the interaction of the cam ramps 61, 62, and 63, and the switch arms 57, 58, and 59 to control, selectively and in combination, the operating sequences and the nonoperating sequences of the powered items to control the system. The coordinated interaction may be engineered and designed in the device to suit the needs of any particular system or the system may be engineered to suit the operation of any control device or various models of control devices.

The scope of the invention is defined in the appended claims.

We claim:

1. A control device having one moving element controlling the application of both e.m.f. and FPF in a system, comprising,
   a case having at least a first wall and a second wall,
   a body in said case having at least a first surface and a second surface;
   said body surfaces lying adjacent said case walls;
   means for moving one said body and said case relative to one another to locate said body relative to said case in at least two positions,
   said case having at least one FPF supply port and one FPF use port in said first wall surmounted by nipples for making connections to FPF supply and use,
   said body first surface slidably sealing against said first ported wall of said case,
   said body first surface having a grooved maze constituting at least two separate channels between said FPF supply and use ports with each said channel selectively communicating between FPF supply and use ports at one said position of said body relative to said case to effect desired application of FPF in a system,
   said case having at least two sets of e.m.f. switch arms and contacts on said second wall,
   e.m.f. terminals on said case leading to and from said switch arms and contacts for connection to e.m.f. supply and use;
   said body second surface having at least two cams with each said cam selectively actuating one said e.m.f. switch arm and contact at one said position of said body relative to said case to effect desired application of e.m.f. in system;
   the cam arm e.m.f. control and the channel port FPF control both being coordinated in operating a system by the position of said body relative to said case.

2. In a device as set forth in claim 1,
   said case having a third wall spaced from and opposite to said first ported wall; and
   a spring on one said body and case bearing against the other at said third wall urging said body channel maze surface in sealed relationship against said case first ported wall.

3. In a device as set forth in claim 1,
   said case having a third wall spaced from and opposite to said first ported wall;
   a spring on one said body and case bearing against the other at said third wall urging said body channel maze surface in sealed relationship against said case first ported wall,
   a ball detent end on said spring; and
   a series of sockets in one said case and body for receiving said spring detent end for holding said body and case relative to one another in adjusted position.

4. In a device as set forth in claim 1, said case defining a linear cavity and said body moving linearly in said case cavity to actuate change of channels and to actuate change of circuits.

5. In a device as set forth in claim 1, said means for moving said case and body relative to one another comprising,
   a lever fulcrumed on said case having a first interior end engaging said body and a second exterior end for actuating said lever.

* * * * *